United States Patent [19]
Champan et al.

[11] 4,044,206
[45] Aug. 23, 1977

[54] DIGITAL DECODER FOR MULTIPLE FREQUENCY TELEPHONE SIGNALLING

[75] Inventors: Louis W. Champan, Kent; Arthur T. Perkins, Bellevue, both of Wash.

[73] Assignee: Melco, Bellevue, Wash.

[21] Appl. No.: 692,122

[22] Filed: June 2, 1976

Related U.S. Application Data

[63] Continuation-in-part of Ser. No. 635,214, Nov. 25, 1975, abandoned.

[51] Int. Cl.² ............................................. H04M 1/50
[52] U.S. Cl. ................................................ 179/84 VF
[58] Field of Search ............... 179/84 VF, 99, 18 AD; 324/78 D

[56] References Cited

U.S. PATENT DOCUMENTS

| 3,537,001 | 10/1970 | Friend | 179/84 VF |
|---|---|---|---|
| 3,582,562 | 6/1971 | Sellari | 179/18 AD |
| 3,760,269 | 9/1973 | Beeman et al. | 179/84 VF |
| 3,790,720 | 2/1974 | Schartmann | 179/84 VF |
| 3,912,869 | 10/1975 | Ullakko | 179/84 VF |
| 3,949,177 | 4/1976 | Ball et al. | 179/84 VF |
| 3,993,875 | 11/1976 | Ebner et al. | 179/84 VF |

Primary Examiner—Kathleen H. Claffy
Assistant Examiner—Gerald L. Brigance
Attorney, Agent, or Firm—Sherman Levy

[57] ABSTRACT

A multiple-frequency decoder which measures the two-tone output from a multiple-frequency dial type telephone and identifies what number was dialed. A unique binary code is produced as a timed output for each number dialed. In addition, the decoder has provision for detecting and providing as a separate output a unique binary output word whenever a preselected transfer digit, e.g., a 1, 2 or 3 is dialed. With this additional output data, transfer relays can be operated. The decoder inputs are derived from high and low pass filters. The decoder differentiates between valid multiple-frequency tones and extraneous noise, such as voice signals, completely digitally, as follows: once the digital measurement of one cycle of each of the multiple incoming frequencies is made, the combination of all frequency measurements is stored as a $k$-bit binary word. In order for an incoming signal to be considered valid, the same $k$-bit binary word must occur $n$ consecutive times, where $n$ is preselected based on the degree of noise immunity required.

16 Claims, 8 Drawing Figures

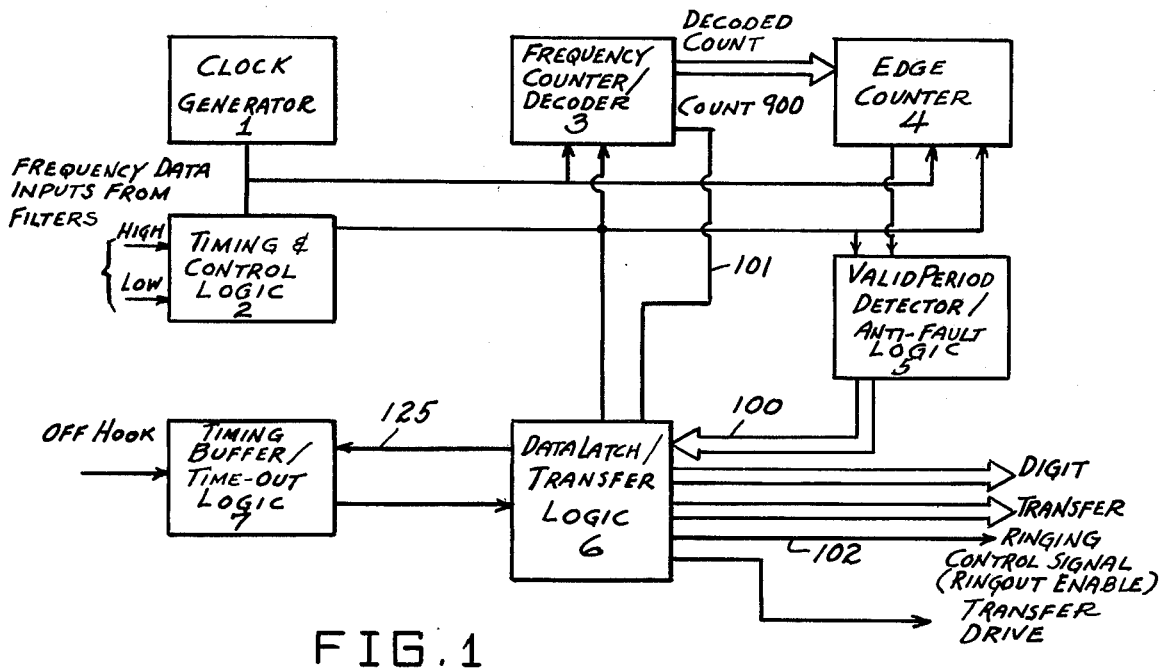
FIG.1
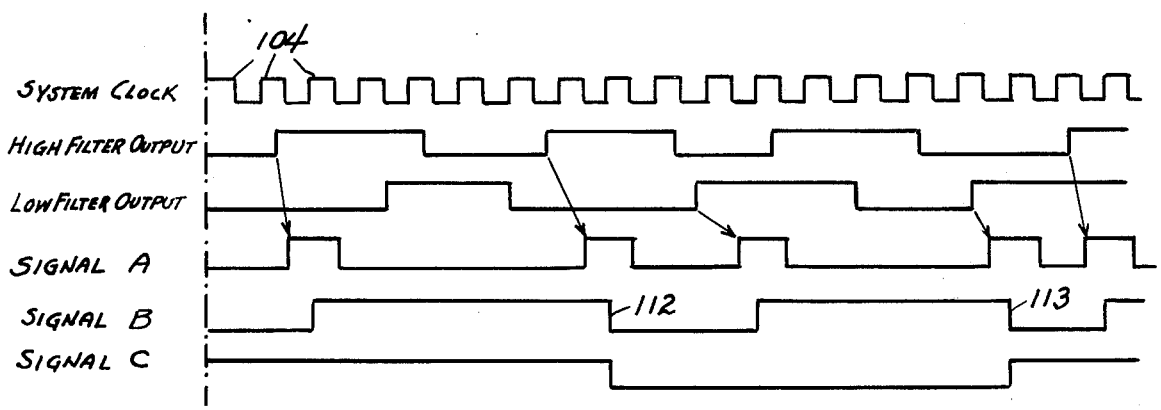
FIG.2    TIMING DIAGRAM

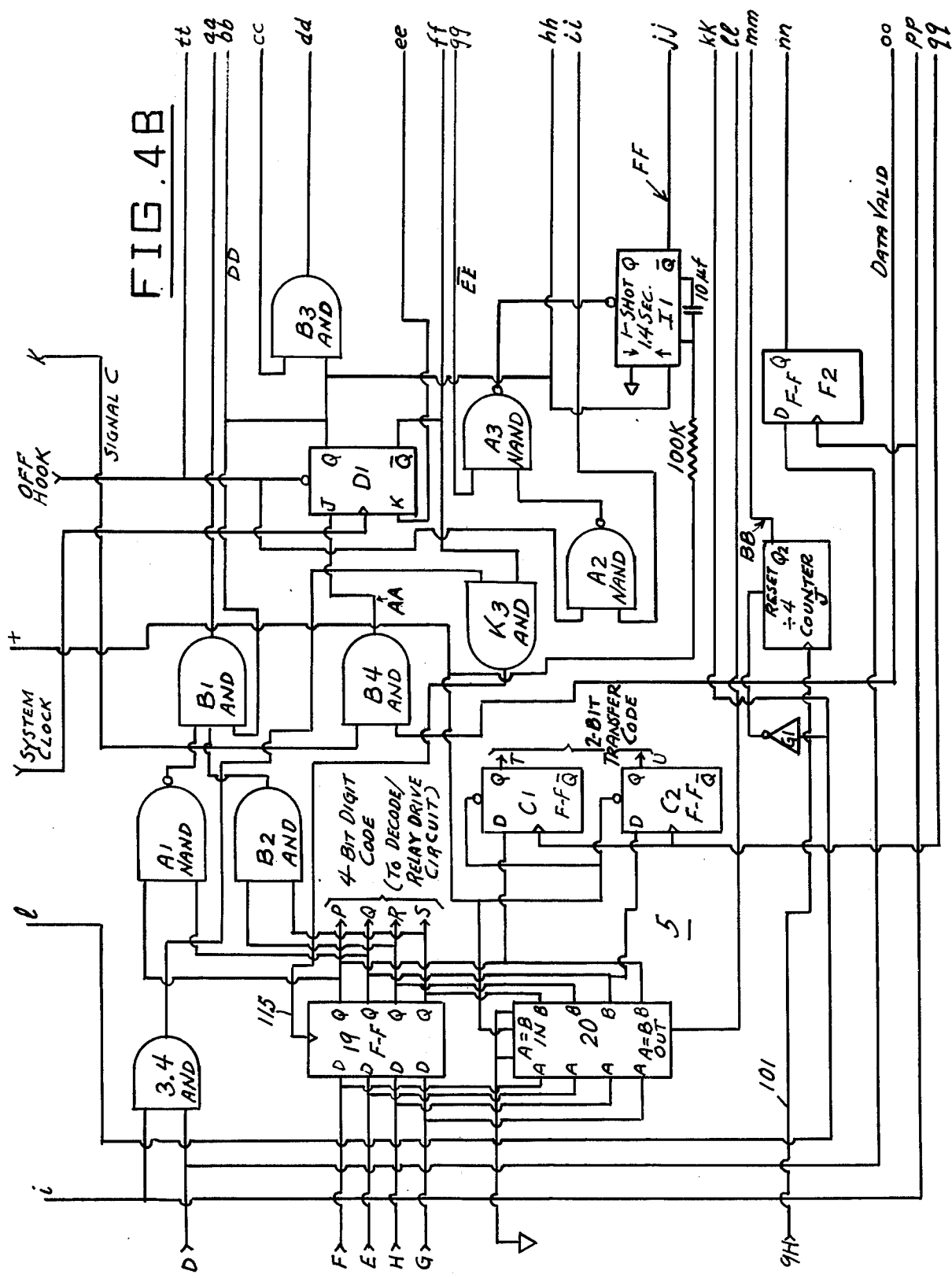

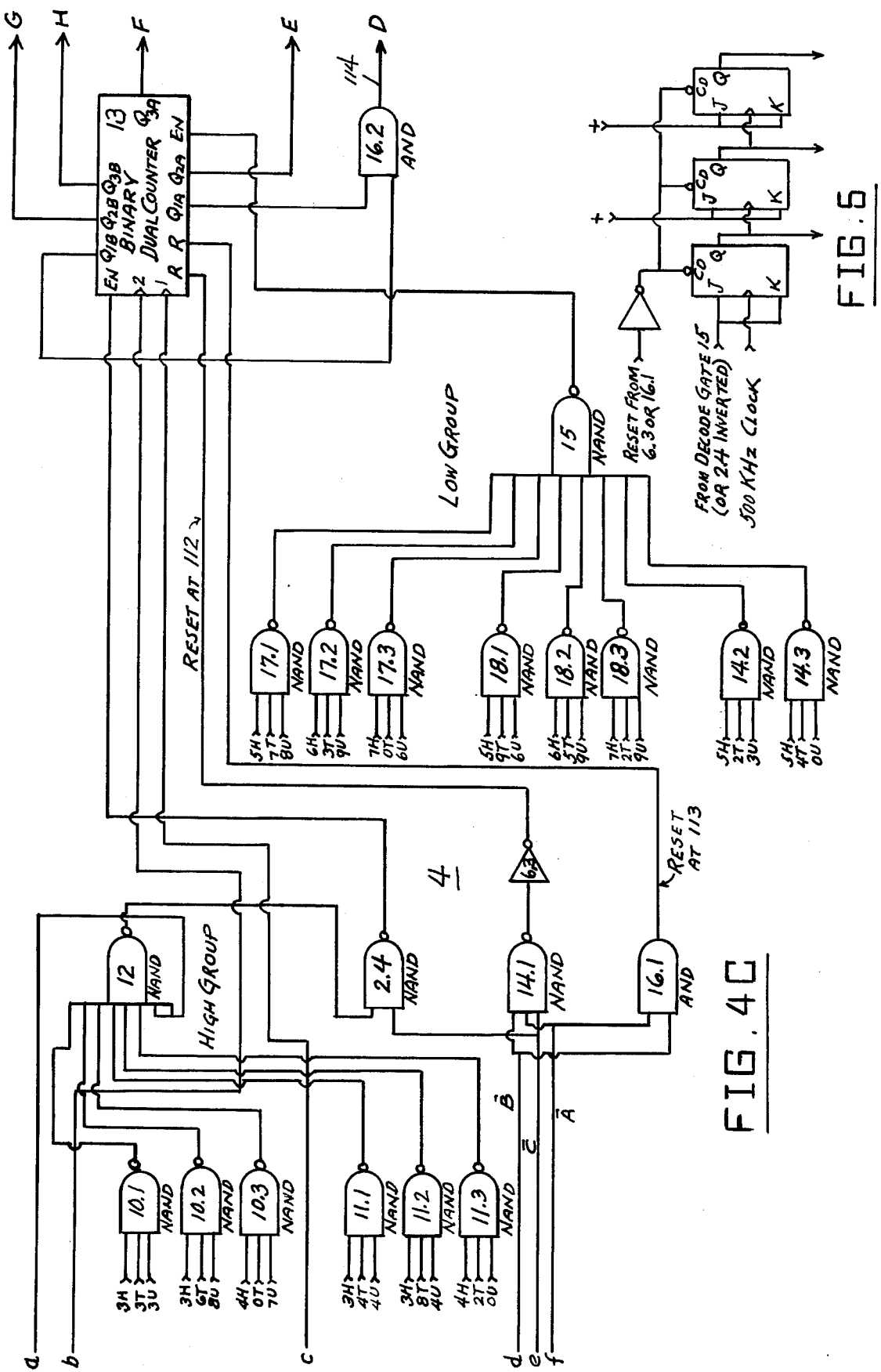

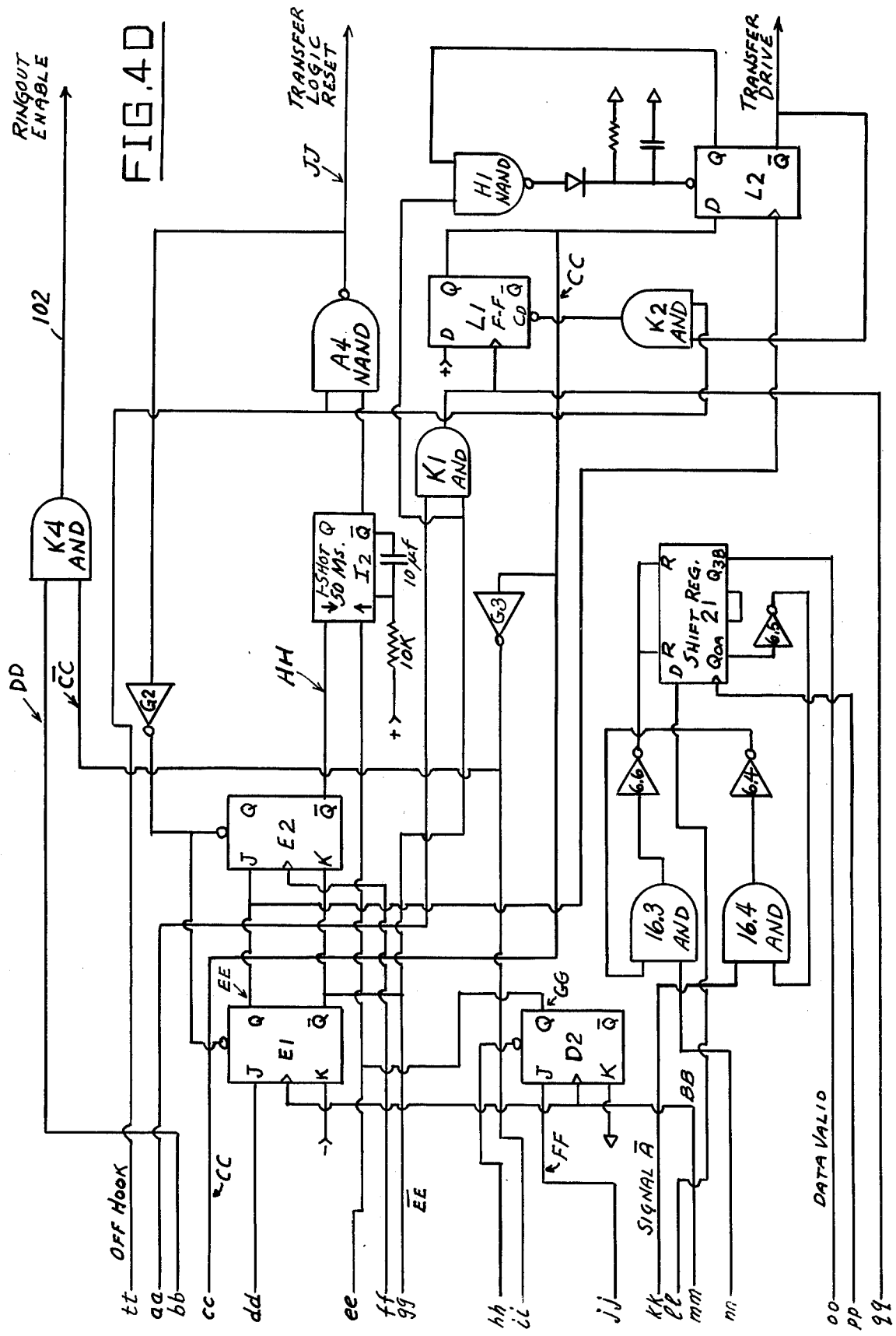

4,044,206

DIGITAL DECODER FOR MULTIPLE FREQUENCY TELEPHONE SIGNALLING

This is a continuation-in-part of our application Ser. No. 635,214, filed Nov. 25, 1975, and entitled "Digital Decoder for Multiple Frequency Telephone Signalling", now abandoned.

This invention relates to systems for decoding signal frequencies, and more particularly to a number decoding system for telephones of the Touch Tone type.

A main object of the invention is to provide a novel and improved electronic system for identifying within close predetermined limits a frequency signal selected from a plurality of predetermined frequency signals, the system including means for measuring the period of the incoming signal, for insuring the validity of the signal, and for differentiating the incoming signal from extraneous noise, such as voice signals.

A further object of the invention is to provide an improved Touch Tone decoding system which measures the two-tone output from a multiple frequency dial type telephone and provides a unique binary code as a time output for each number dialed and which also provides as a separate output a unique binary output word whenever a transfer digit is dialed so that this latter output can be employed to operate transfer relays, the decoding system being capable of handling a large number of different number codes, providing a high degree of resolution, and being protected against interference from extraneous noise such as voice signals.

A still further object of the invention is to provide an improved method and means for identifying within predetermined frequency limits the two frequencies which comprise a valid Touch Tone signal, wherein the system measures the period of an incoming frequency, identifies the incoming signal by counting how many frequency edges are reached by a predetermined clock frequency within the time interval equal to the period of the incoming frequency, and which includes means for resetting all logic after the incoming signal has been verified as being a valid Touch Tone signal and following the absence of the signal for a predetermined period, for example, 1.4 seconds.

A still further object of the invention is to provide an improved method and means for differentiating between valid Touch Tone signals and extraneous noise, such as voice signals, by comparing currently received data with previously received data for $n$ consecutive times before allowing data to be latched as output data for a predetermined time.

A still further object of the invention is to provide an improved digital method and means for detecting predetermined frequency combinations as transfer digits and, upon verification of any of the predetermined frequency combinations, for presenting this data as an output in the form of a unique binary word, providing means for preventing single digit data from being presented as an output, and wherein upon verification of another Touch Tone signal, giving an output from the single digit latch even though it may be the same data as was previously decoded as a transfer digit, thereby giving as latched data two unique binar words representing a two digit code, such as 22, and providing means wherein upon the absence of a further incoming signal for a predetermined period, such as 1.4 seconds, both data latches are reset.

A still further object of the invention is to provide an improved Touch Tone telephone decoding system which can identify incoming frequencies within a desired resolution, e.g., 1 Hz, . of a predetermined tolerance, which is adaptable for easily changing the predetermined tolerances of the nominal frequencies, and which is adaptable for easily changing the degree of resolution of the measurement of a predetermined frequency, and which is adaptable for easily changing the predetermined nominal frequencies.

Further objects and advantages of the invention will become apparent from the following description and claims, and from the accompanying drawings, wherein:

FIG. 1 is a block diagram showing the major functional components of the tone decode/transfer logic of a Touch Tone decoding system according to the present invention.

FIG. 2 is a timing diagram showing the phase relationships of certain operating signals occurring in the system of FIG. 1.

FIGS. 4A, 4B, 4C and 4D are wiring diagrams, which when taken together, show a typical tone decoding circuit in accordance with the block diagram of FIG. 1.

FIG. 5 is a diagram showing an alternate binary edge counter stage which may be employed in the circuit of FIGS. 4A, 4B, 4C and 4D.

Figure 3:
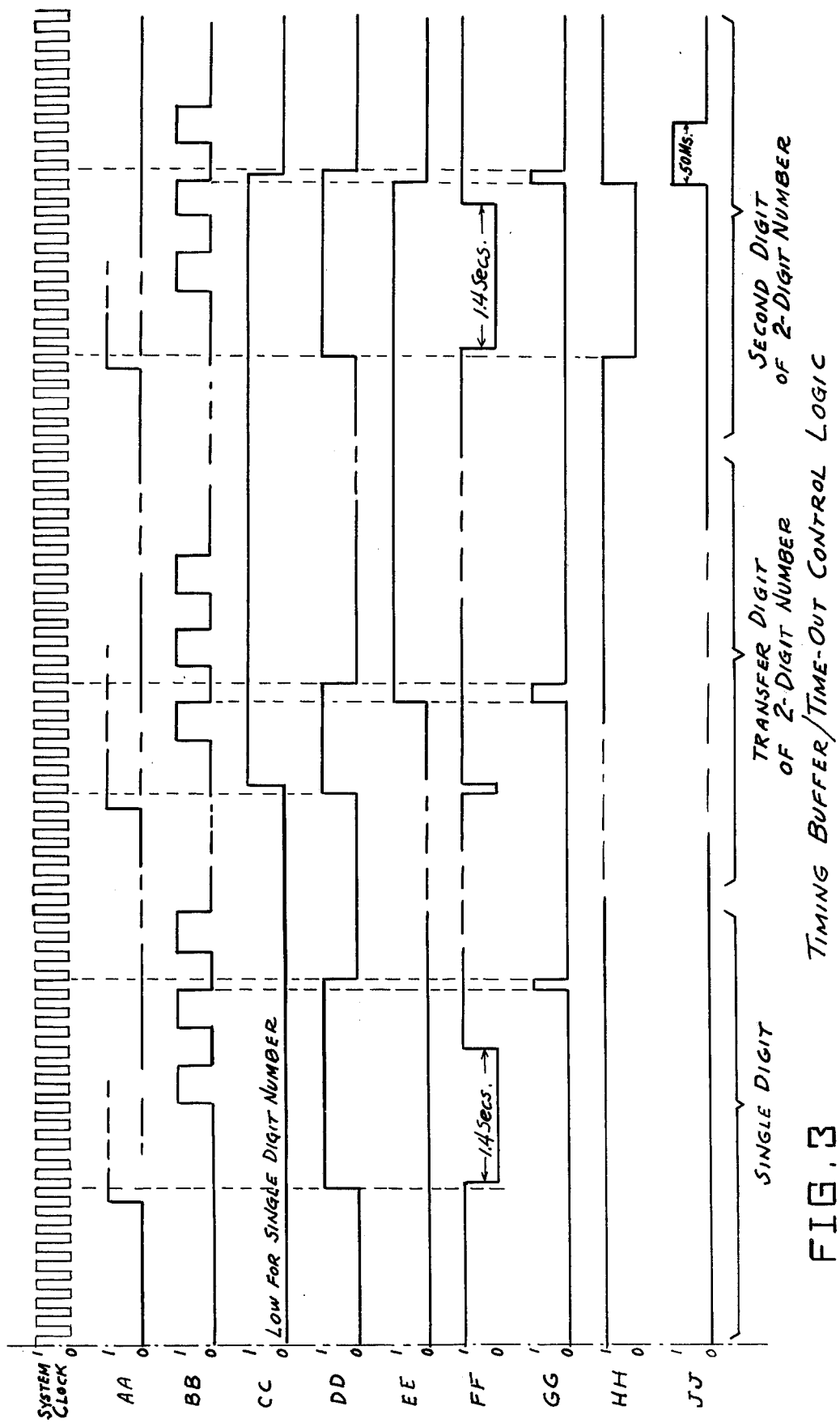
FIG. 3 is a diagram showing the timing of the output signals associated with the operation of the timing buffer/time-out control logic components of the system of FIG. 1.
Figure 4A:
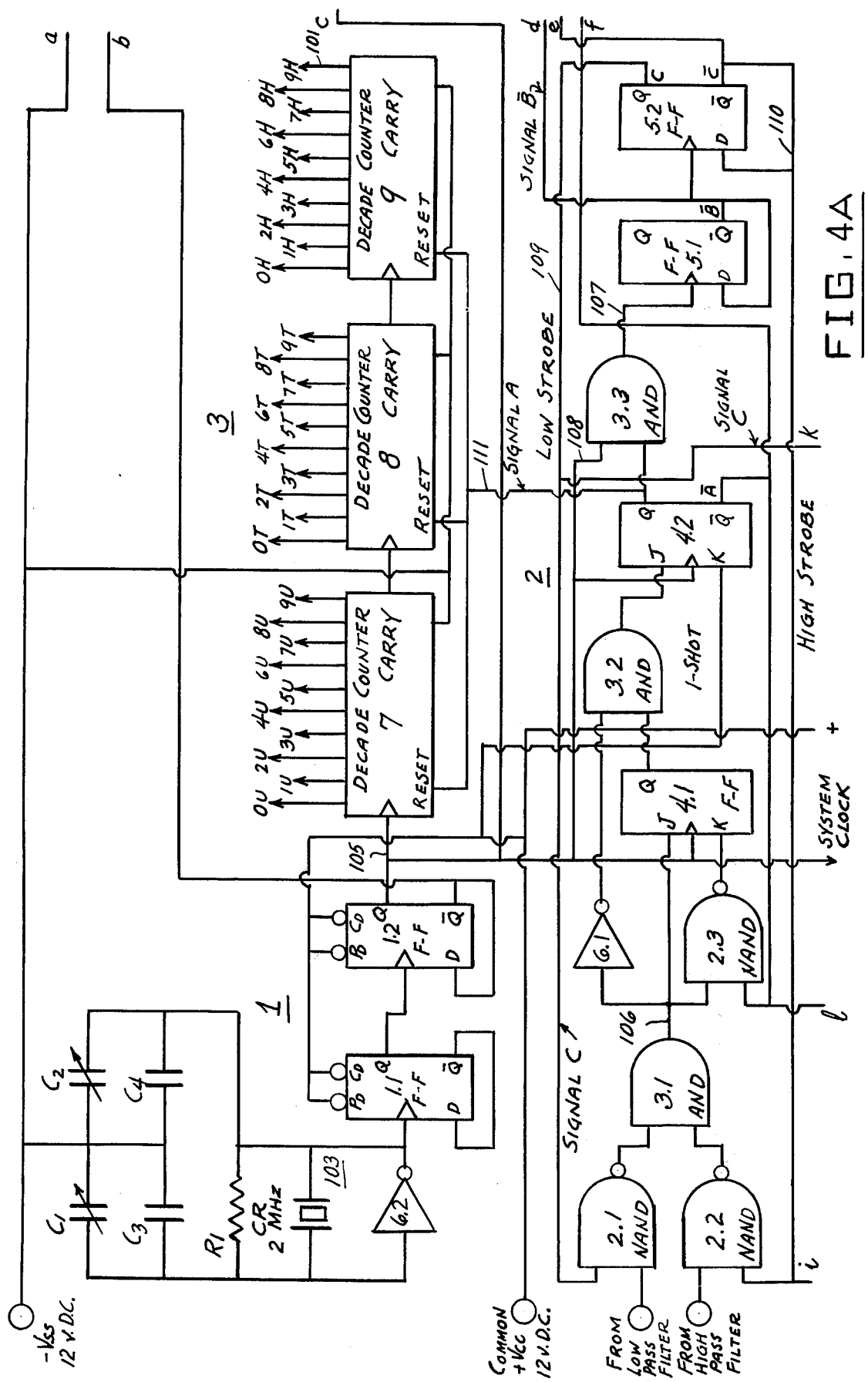

FIGS. 1 through 5, and the detailed descriptions presented herein which accompany these drawings, describe a specific circuit capable of interfacing with a Touch Tone dial system. The claimed invention includes, but is not limited to, these drawings and detailed descriptions, specifically with regard to data word size, clock frequency, and details of this nature which, while not pertinent to functional relationships, may tend to limit the claims and application of the present invention.

Through the exclusive use of digital circuitry the multiple-frequency decoder of the present invention measures the two-tone output from a multiple-frequency dial type telephone, and identifies which button was pushed, or in other words, what number was dialed. A unique binary code is given as a timed output for each number dialed.

In addition to just decoding digits 0 through 9, this decoder has provision for detecting and giving as a separate output a unique binary timed output word whenever digits 1, 2 or 3 are dialed. With this additional output data transfer relays can be operated. With data available the herein-described typical Touch Tone decoder can accommodate 37 different codes, namely, 0, 1, 5, 6, 7, 8, 9, 10, 11, ... 19, 20, 21, ... 29, 30, 31, ... 39.

The inputs required by this decoder can be derived from conventional high and low pass filters.

This decoder makes the differentiation between valid multiple-frequency tones and extraneous noise, such as voice signals, completely digitally. The way this is accomplished is as follows: once the digital measurement of one cycle of each of the incoming frequencies is made, the combination of all such measurements is stored as a 4-bit binary word; it is required that the same 4-bit binary word occur 8 consecutive times; each time another set of measurements is made it is compared to the previous measurement result, which is the previous 4-bit binary word; if the previous and the new 4-bit binary words equal one another 8 consecutive times, then the output of the latches, which have stored in them the unique binary word corresponding to the digit dialed, will be enabled for a timed duration, after which all latches will be reset.

In this way the decoder does not have to delay the incoming signal to allow for the telephones's output to stabilize. Immediately upon receipt of a signal the decoder begins making the measurement and also, simultaneously with this, interrogates the signal for stability. Eight cycles of equality are needed for data to be considered valid, but any time during the measurement that the present data does not equal the previous data the stability counter is reset and 8 more cycles of equality are required.

It is to be noted that the decoder is not limited in the frequencies of detection or tolerances of the frequencies. By a simple change in the connection of the decode gates 10.1–10.3, 11.1–11.3, 14.2–14.3, 17.1–17.3 and 18.1–18.3, the nominal frequencies and tolerances of the nominal frequencies of detection can be changed. The resolution provided for in the disclosed typical decode network is 1 Hz.

All measurements are referenced to a 500 KHz clock, which is derived from a 2 MHz crystal oscillator. One way in which the decoder of the present invention differs significantly from others is in the way it makes the distinction between frequencies, thereby identifying which digit was dialed, that is, this decoder does not count cycles of the incoming frequency; instead it counts the waves, or zero crossing edges, of a predetermined frequency (500 KHz) over the interval of time represented by the period of the incoming frequency. This is done for both the high and low frequency of the multiple-frequency tone. Assuming that the decoder is measuring the high frequency, during this interval the counters are incrementing and every time the count in them reaches a count representative of a frequency edge depicted in Table III, presently to be given, and in FIG. 2, one of the decode gates recognizes this and allows the edge counters to increment one count. At the end of the interval the number of edges that have been decoded will be represented by the count which is in the edge counter. This exact operation is repeated for the low group edge counter.

In this way the resolution of the unit need not be limited to 1 Hz, but could be continued out to the limits of the predetermined frequency by simply adding more stages of frequency counters and decoders and increasing the 500 KHz clock. In the present case it is chosen to limit the clock count in the counters to a 3-digit count which will provide a 1 Hz resolution in the programmed bandwidths of the nominal frequencies of interest.

The tolerances of a signalling frequency signal generated by a Touch Tone telephone set is within ∓ 1½% of a nominal frequency. Any received signal having a frequency that falls within ∓ 1½ % of the nominal frequency must be considered valid. The following Tables I and II show four nominal low group frequencies and three nominal high group frequencies, respectively, used in Touch Tone multiple-frequency signalling applications, as well as the ∓ 1½ % tolerances. In Table III the clock counts along with the frequency edge limits and the percentage of nominal frequency they represent are shown.

TABLE I

| Nominal Frequency | − 1½ % | + 1½ % |
|---|---|---|
| 697 Hz | 686.545 Hz | 707.455 Hz |
| 770 Hz | 758.450 Hz | 781.550 Hz |
| 852 Hz | 839.220 Hz | 864.780 Hz |
| 941 Hz | 926.885 Hz | 955.115 Hz |

TABLE II

| Nominal Frequency | − 1½ % | + 1½ % |
|---|---|---|
| 1209 Hz | 1190.865 Hz | 1227.135 Hz |
| 1336 Hz | 1315.960 Hz | 1356.040 Hz |
| 1477 Hz | 1454.845 Hz | 1499.155 Hz |

TABLE III

| Clock Counts Corresponding to Frequency Edges | Frequency | Tolerance |
|---|---|---|
| 729 Counts | 685.875 Hz | − 1.596 % |
| 706 Counts | 708.215 Hz | + 1.609 % |
| 659 Counts | 758.725 Hz | − 1.464 % |
| 639 Counts | 782.472 Hz | + 1.619 % |
| 596 Counts | 838.926 Hz | − 1.534 % |
| 578 Counts | 865.051 Hz | + 1.531 % |
| 540 Counts | 925.925 Hz | − 1.602 % |
| 523 Counts | 956.022 Hz | + 1.596 % |
| 420 Counts | 1190.476 Hz | − 1.532 % |
| 407 Counts | 1228.501 Hz | + 1.612 % |
| 380 Counts | 1315.789 Hz | − 1.512 % |
| 368 Counts | 1358.696 Hz | + 1.698 % |
| 344 Counts | 1453.488 Hz | − 1.591 % |
| 333 Counts | 1501.501 Hz | + 1.658 % |

As above mentioned, the tone decode logic receives analog frequency data from the low- and high-pass filters, processes the data digitally to differentiate between extraneous signals and valid tone combinations, and decodes valid tones into a stable digital output word representing the dialed digit.

The transfer logic receives the digit word from the tone decode logic, transmits the word, with timing buffering, to either the transfer ready group or the digit relay tree, as appropriate, and generates the ring time-out function.

Referring to the drawings, the block diagram of FIG. 1 defines the major functional components of the tone decode/transfer logic. Blocks 1 through 5 comprise the tone decode logic; blocks 6 and 7 provide the transfer logic.

The clock generator (block 1) provides a single-phase, single frequency reference signal to operate the frequency counters and all sequential logic within the system.

The timing and control logic (block 2) selects either the high or the low filter output for processing and generates key timing signals which control the processing sequences. These timing signals and their functions are described below with reference to the timing diagram of FIG. 2.

Signal A (the output of flip-flop 4.2 of FIG. 4A) is a digitally generated 1-shot pulse which occurs synchronously with and exactly for one cycle of the system clock upon receipt of a leading-edge transition of the selected filter output. Signal A is utilized to reset the frequency counters (block 3) and to generate the timing signal B (the output of flip-flop 5.1 of FIG. 4A) and its complement is also utilized to eliminate signal timing skew uncertainties (race conditions) when gated with signals B and C.

The complement of signal B is used to generate signal C (the output of flip-flop 5.2 of FIG. 4A) and to reset the edge counters for both the high and low frequency signal groups (block 4).

Signal C feeds back within the timing and control logic (block 2) to select which of the two filter signals will generate 1-shot pulses (signal A).

As noted from the timing diagram of FIG. 2, signal C will allow signal A to occur for the beginning of two consecutive cycles each of the high and low filter signals, or the beginning and end of one cycle each of the high and low filter signals.

The complement of signal C is also utilized to reset the high group only edge counter (block 4) and to latch the edge counter outputs of both into the anti-fault logic (block 5).

The frequency counter (block 3) consists of a three-stage fully decoded BCD counter 7, 8, 9 (FIG. 4A) providing a count range of 0–999 with ten unique outputs (OU . . . 9U,OT . . . 9T,OH . . . 9H) for each of the units, tens and hundreds stages. The counter is clocked directly from the system clock and is allowed to free-run, providing a numerical indication of elapsed time between successive reset pulses. Since the reset pulses (signal A) generated by the timing and control logic (block 2) are derived from filter output transitions, the resulting count just prior to reset will be proportional to the period of the selected filter output.

The edge counter unit (block 4) decodes count values of significance from the count data generated in block 3. Count values considered to be significant represent the low and high limit values of the period of any valid tone. The significant count decoders operate two independent edge counters (in dual counter 13), one counter being utilized for each of the high and low tone groups (see FIG. 4C).

The edge counters operate as follows: the counters are reset to zero until the first positive transition of any one filter; at that time the reset becomes inactive (the high-group counter is reset at half the rate of the low-group counter so that its data remains stable during evaluation of the low-group count). With the reset inactive, the counter will increment one count each time a significant limit is decoded. The first (and all odd) significant limit marks the beginning of a valid tone, and for this situation the least significant bit of the edge counter will always be true. The edge counter will remain stable until the next (even) significant limit is decoded (end of valid tone), at which time the counter will increment once more, causing the least significant bit to be false. This process will continue until just prior to the second positive transition of the selected filter signal, at which time the edge counter output data is latched into the anti-fault logic (block 5). Thus, the latched count data will represent a unique binary output word for each of the three high and four low tone groups of a Touch Tone pad.

The valid period/anti-fault logic (block 5) provides immunity from spurious signals by imposing two independent requirements on the edge counter output data, both of which will be satisfied by a valid tone combination. The first such requirement is that the data from both the high and low edge counters be within the period range of a valid tone (edge counter least significant bits are true). If this condition is false, latching of the edge counter output data will be inhibited. The second requirement is that the latch data be identical for at least eight consecutive cycles of both the high and low filter outputs; if the new and previous data differ at any time prior to this, the data valid strobe (enabling pulse) signal will be reset and will remain inhibited for at least eight cycles thereafter.

The data latch/transfer logic (block 6) receives latched edge counter output data and the data valid strobe signal from the anti-fault logic (block 5). The circuitry of the timing buffer/time-out control block 7 contains buffer latches 19, C1 and C2, one of which (19) is integral with the anti-fault logic and has bit outputs (P,Q, R, S) which (FIG. 4B) drive the digit relay tree directly via transistor buffers (not shown), and the other of which (C1 and C2) has transfer bit outputs (T,U) which drive the transfer relays. The circuitry also provides transfer logic which interfaces with the edge counter data to differentiate between transfer and digit updates.

The transfer logic operates as follows: provided that a valid data strobe signal is received from the anti-fault logic (block 5), and a transfer digit has been detected via gates A1, B1 and B2, flip-flop L1 will be set high and the transfer code derived from latch 19 will be clocked into latches C1 and C2. If transfer latch L1 is set, flip-flop E1 will be clocked high when the transfer logic detects an off-key condition as evidenced by an overflow condition at 101 of the frequency counter (block 3). Counter J buffers the overflow signal to provide off-key pulses signal BB. Flip-flop E1, when active, will cause the second digit to be sensed as a single digit, enabling the ringout.

The timing buffer circuit (block 7) performs three functions, described below with reference to the timing diagram of FIG. 3. The first function involves the relative timing of the relay switching operation: all multi-contact relays of both the digit relay tree and the transfer relays will switch dry, the burden of switching current being imposed upon the form "A" contacts (not shown). Thus, when the valid data strobe signal is received from block 5, the form "A" relays must be delayed on enable, and disabled prior to resetting of the multi-contact digit and transfer relays. The second function of the timing buffer is to provide operation of the ringout relays for 1.4 seconds or the duration of an on-key condition, whichever is longer. The third function provides for resetting of the output latches of block 6 upon termination of ringout or an on-hook condition.

DETAILED DESCRIPTION OF THE CIRCUIT

Block 1 (FIG. 4A) consists of a 2 MHz crystal oscillator 103 driving divide-by-four flip-flops 1.1. and 1.2 to generate the 500 KHz system clock pulses delivered at 105.

Block 2 (FIG. 4A) consists of a digital 1-shot (flip-flop stages 4.1 and 4.2, and gates 2.3, 6.1 and 3.2), and input steering logic (flip-flop stages 5.1 and 5.2, and gates 2.1, 2.2, 3.1 and 3.3). A positive transition at the output 106 of gate 3.1 will initiate a single pulse beginning at the trailing edge of the system clock pulse 104 and continuing until the next clock pulse trailing edge. The output of gate 3.1 must return low and be brought high again before another 1-shot pulse will be initiated. The 1shot output at 107 (gated at 108 with the system clock to prevent race conditions due to signal skew) serves as the clock input to counter stages 5.1 and 5.2, which provides steering inputs at 109 and 110 to the "and-or" logic of gates 2.1, 2.2 and 3.1.

Block 3 (FIG. 4A) consists of the three decoded BCD counters 7, 8, 9, the first stage of each being clocked by the carry output of the preceding stage. The counters are free-running, being synchronized at 111 by reset pulses, which occur only if both filter outputs are active. This free-running property will result in counter overflow during an off-key condition, providing the 9H indication at 101.

Block 4 consists of count decode gates 10.1–10.3, 11.1–11.3, 12, 14.2–14.3, 15, 17.1–17.3 and 18.1–18.3, reset gating 14.1 and 16.1 and dual counter 13 (FIG. 4C). The two counter stages of 13 are independent of each other; each will increment one count for an active low condition occurring on any one of its associated 3-input decode gates 10.1–10.3, etc. The high-group counter (associated with gate 12) is reset at the low transition 112 (signal C); the low group counter (associated with gate 15) is reset at the low transition 113 of signal B. Since transitions of signal C occur at half the rate of signal B, the high-group data will remain stable as the low-group data is being evaluated. The actual edge counter may be implemented by the dual binary counter 13 or two each of the three J-K flip-flop stages shown in FIG. 5 as the alternate.

Block 5 consists of gates 3.4 (FIG. 4B), 16.2 (FIG. 4C), 16.3, 16.4 latch 19, comparator 20, flip-flop stage F2 and shift register 21 (FIG. 4D). Provided that a valid tone combination exists at dual counter 13, the output at 114 of gate 16.2 will be true and the clock signal into latch 19 will be enabled at 115 via gate 3.4. Otherwise, the clock signal into latch 19 will be inhibited, and flip-flop F2 will go false, resetting shift register 21. The data clocked into latch 19 remains stable until the next positive transition of gate 3.4. At that time the latch input data (furnished at inputs F, E, H, G) and the latch output data (at the "Q" output terminals of latch 19) are compared in comparator 20 for equality of present and previous data. If equality exists, the input to shift register 21 will be true at the time shift register 21 is clocked.

The output of QoA of shift register 21 (21 is a dual shift register connected in series to form an 8-bit shift register) feeds back, via gates 16.3 and 16.4 and inverters 6.4–6.6, to the reset lines of shift register 21, such that both the output QoA and the signals D, which is delayed by flip-flop F2, must be true to inhibit reset of all storage elements within shift register 21. Signal QoA, complemented through inverter 6.5, is gated at 16.4 with signal A to inhibit reset until after shift register 21 is clocked, thus permitting output QoA to become true after a previously false condition.

Providing, therefore, that QoA remains true (reset inhibited), the true input data to shift register 21 will propagate to the next succeeding internal storage element within the shift register after each clock pulse. After eight successive clock pulses, internally-propagated true data will reach the final storage element, causing output Q3B to become true, providing a data valid indication to the transfer logic (block 6).

QoA will remain true only if the D input to shift register 21 is true at the time of the clock input. Therefore, if the D input becomes false (at the time of the clock) at any time prior to the output Q3B becoming true, all internal storage elements will be reset, initializing register 21 and thus requiring at least eight more clock cycles before a data valid indication is obtained. As implemented, the shift register output may be tapped at any stage prior to Q3B, thus providing flexibility as to the degree of stability required of the edge counter data before a data valid indication is obtained.

Block 6 (FIGS. 4B,4D) consists of gates A1,A2-,A4,B1,B2,B3,K1,K2,H1, B2,B3, flip-flop stages E1-,E2,L1 and L2, latches C1 and C2 and 1-shot I2. "And-/or" gating A1, B2, B1 discriminates between a transfer or non-transfer digit; the resulting output of gate B1 will clock flip-flop L1 and latch C1 and C2 when enabled by the low output of flip-flop E1.

Flip-flop F1, when enabled, sets transfer active (signal CC) high, disabling the ringout, enabling flip-flop E1, via gate B3, and resetting timeout 1-shot I1. Flip-flop E1, which will then be clocked high from off-key signal BB, will cause the data stored in flip-flop L1 to be transferred to flip-flop L2, thus resetting flip-flop L1 and operating the transfer relays via the Transfer Drive output signal. The resetting of flip-flop L1 causes signal CC to be low, so that the second digit will be interpreted by the timing buffer circuit (block 7) as a single digit. Signal EE remains high as flip-flop D1 is set high on the second digit, causing signal HH to be set low and enabling (but not triggering) 1-shot I2. 1-shot I2 will be triggered after the second-digit timeout from signal GG, initiating reset pulse JJ which deactivates the transfer relays and resets flip-flops E1, E2 and L2.

Block 7 consists of gates B3, B4, K3 and K4, flip-flops D1,D2 and 1-shot I1.

The timing buffer circuit operates as follows (refer to FIG. 3): After the decode logic has begun to receive signals but before the valid data strobe signal is generated from the Anti-Fault Logic (block 5), the edge counter output data (shown at 100) will be clocked into latch 19. The occurrence of a valid data strobe signal (AA) will set FF true via D1, (signal DD high) enabling the transfer/timeout sequence and inhibiting further updates of latch 19, thus ensuring that the data presented to the relay tree (not shown) will remain stable throughout the timeout operation. Signal DD, via gate K4 will also enable the relay selected by data P,Q,R,S, and will trigger timeout 1-shot I1, setting signal FF low. Providing that the timeout 1-shot is not reset, signal FF will remain low for the desired timeout period, maintaining GG in a low state and thus inhibiting flip-flop D1 from being reset. After the timeout period, signal FF will return to the high state, enabling flip-flop D2. The presence of off-key pulses (signal BB) thereafter, will clock enabled flip-flop D2, setting signal GG high for a duration sufficient to reset flip-flop D1, which reinitializes the system.

Operation of the timing buffer circuit is modified by signal CC which, when set low upon receipt of a transfer digit, resets timeout 1-shot I1 via gate A2, thus enabling the circuitry to be initialized for the second digit. Resetting of 1-shot I1 is inhibited for the second digit by signal EE and gate A3.

While a specific embodiment of an improved Touch Tone number decoder has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A Touch Tone number decoder comprising means to generate clock pulses at a relatively high frequency as compared with the Touch Tone frequencies, means to derive a binary code word as a timed output for a number dialed, said binary word representing the number of said clock pulses over the intervals of time represented by the periods of the Touch Tone frequencies corresponding to the dialed number, means to store the binary word, means to compare a received binary word with a stored binary word for a plurality of consecutive times and derive a true input signal each time equality exists, shift register means arranged to fill up only in response to the reception of successive true input signals for said plurality of successive times, means to deliver the true input signals to said shift register means, means to derive a data valid signal responsive to the filling up of said shift register means by such consecutive true input signals, and means to transmit the stored binary word responsive to a data valid signal.

2. The number decoder of claim 1, and means to transmit a ringing control signal after said stored binary word has been transmitted.

3. The number decoder of claim 2, and means to maintain said ringing control signal for a predetermined time period after said stored binary word is transmitted.

4. The number decoder of claim 3, and means to reset said binary word storage means at the termination of said ringing control signal.

5. The number decoder of claim 1, and wherein said binary code word-deriving means for deriving a unique binary code word as a timed output when a number representing a transfer digit is dialed, transfer digit output means, wherein said binary word-storing means includes means to store said transfer digit code word, wherein said received binary word-comparing means includes means to compare the received transfer digit word with the stored transfer digit word for said plurality of consecutive times, and means responsive to a data valid signal derived by said shift register means for the dialed number representing said transfer digit to transmit the stored transfer digit word to the transfer digit output means if the received and stored transfer digit words are equal for said consecutive times.

6. The number decoder of claim 5, and gate means to discriminate between non-transfer and transfer digits in enabling the first-named and second-named stored binary word-transmitting means.

7. A Touch Tone number decoder comprising clock means to generate clock pulses at a relatively high frequency as compared with the Touch Tone frequencies, Touch Tone frequency input means, free-running counter means, circuit means connecting said clock means to said counter means, means to reset said counter means responsive to the leading edge of Touch Tone frequencies received by said input means, means to count the accumulated clock pulses over the periods of the respective Touch Tone frequencies received at said input means and to derive a binary code word representing said accumulated clock pulses, whereby the binary code word represents a number dialed, means to store the binary code word, means to compare a derived binary code word with a preceding stored binary code word for a plurality of consecutive times means to transmit the stored binary code word if the derived code word is equal to the stored code word for said plurality of consecutive times, means to transmit a timed ringing control signal after transmission of said stored binary code word, and means responsive to an overflow condition of said free-running counter means to terminate said ringing control signal.

8. A Touch Tone number decoder comprising clock means to generate clock pulses at a relatively high frequency as compared with the Touch Tone frequencies, Touch Tone frequency input means, free-running counter means, circuit means connecting said clock means to said counter means, means to reset said counter means responsive to the leading edge of Touch Tone frequencies received by said input means, means to count the accumulated clock pulses over the periods of the respective Touch Tone frequencies received at said input means and to derive a binary code word representing said accumulated clock pulses, whereby the binary code word represents a number dialed, means to store the binary code word, means to compare a derived binary code word with a preceding stored binary code word for a plurality of consecutive times, means to transmit the stored binary code word if the derived code word is equal to the stored code word for said plurality of consecutive times, wherein the comparison means comprises a comparator, means connecting the comparator to said storage means in a manner to compare incoming binary code data with binary code data previously stored, said comparator having means to generate a difference signal responsive to inequality of the incoming data and the stored data, shift register means, means to clock said shift register means along with each count of said accumulated clock pulses, means to reset the shift register means and the storage means responsive to such difference signal, and means to enable said transmitting means when the shift register means has been clocked for said plurality of consecutive times in the absence of such difference signal.

9. The number decoder of claim 8, and means to transmit a ringing control signal for a predetermined ringing time following the transmission of said stored binary word, and means to reset said storage means a predetermined period of time after the time-out of said ringing control signal.

10. A Touch Tone number decoder having input means adapted to receive outputs from respective Touch Tone low and high pass filters, comprising clock means to generate clock pulses at a relatively high frequency as compared with the Touch Tone frequencies, free-running counter means, circuit means connecting said clock means to said counter means, means to generate a 1-shot pulse upon receipt of a selected filter output, means to reset the counter means and to generate a first timing signal responsive to said 1-shot pulse, edge counter means, means to increment the edge counter means responsive to a count corresponding to a significant Touch Tone period limit reached by said first-named counter means, means to generate a further timing signal and to reset the edge counter means responsive to said first timing signal means to control the selection of the filter output in accordance with said further timing signal, anti-fault logic means, means to decode the output of the edge counter means, reset the edge counter means and latch the edge counter means output into the anti-fault logic means responsive to said further timing signal, the latched data representing a binary output word for a Touch Tone group, said anti-fault logic means including means to compare the latched data for a plurality of sequential receptions, digit relay tree input means and transfer relay input means, and means to selectively energize said digit relay ree input means and said transfer relay input means in accordance with said binary output word responsive to the absence of a difference in the latched data for said plurality of sequential receptions.

11. The Touch Tone number decoder of claim 10, and means to generate a ringing control signal responsive to the absence of a difference in the latched data for said plurality of sequential receptions.

12. The Touch Tone number decoder of claim 10, and wherein said selectively energizing means includes digit-discriminating gating means connected between the output of the edge counter output-decoding means and the tranfer relay input means.

13. The Touch Tone number decoder of calim 12, and ringout enable means, means to activate said ringout enable means responsive to the absence of a difference in the latched data for said plurality of sequential receptions, and means to disable said ringout enable means when the transfer relay input means is energized.

14. The Touch Tone number decoder of claim 10, and means to inhibit further updates of latched data for a predetermined time-out period after said plurality of sequential receptions, sufficient to allow energization of said digit relay tree input means.

15. The Touch Tone number decoder of claim 10, and means to inhibit further updates of latched data for a first predetermined time-out period after transfer relay data has been latched, sufficient to allow energization of said transfer relay input means, and means to inhibit further updates of latched data for a second predetermined time-out period after second-digit has been latched, sufficient to allow energization of said digit relay tree input means.

16. The Touch Tone number decoder of claim 15, and transfer logic reset circuit means, and means to energize said transfer logic reset circuit means at the end of said second time-out period.

* * * * *